Oct. 18, 1955  H. E. METCALF  2,720,962
MEANS FOR ORIENTATING INDENTED FRUIT
Filed Aug. 4, 1947  2 Sheets-Sheet 1
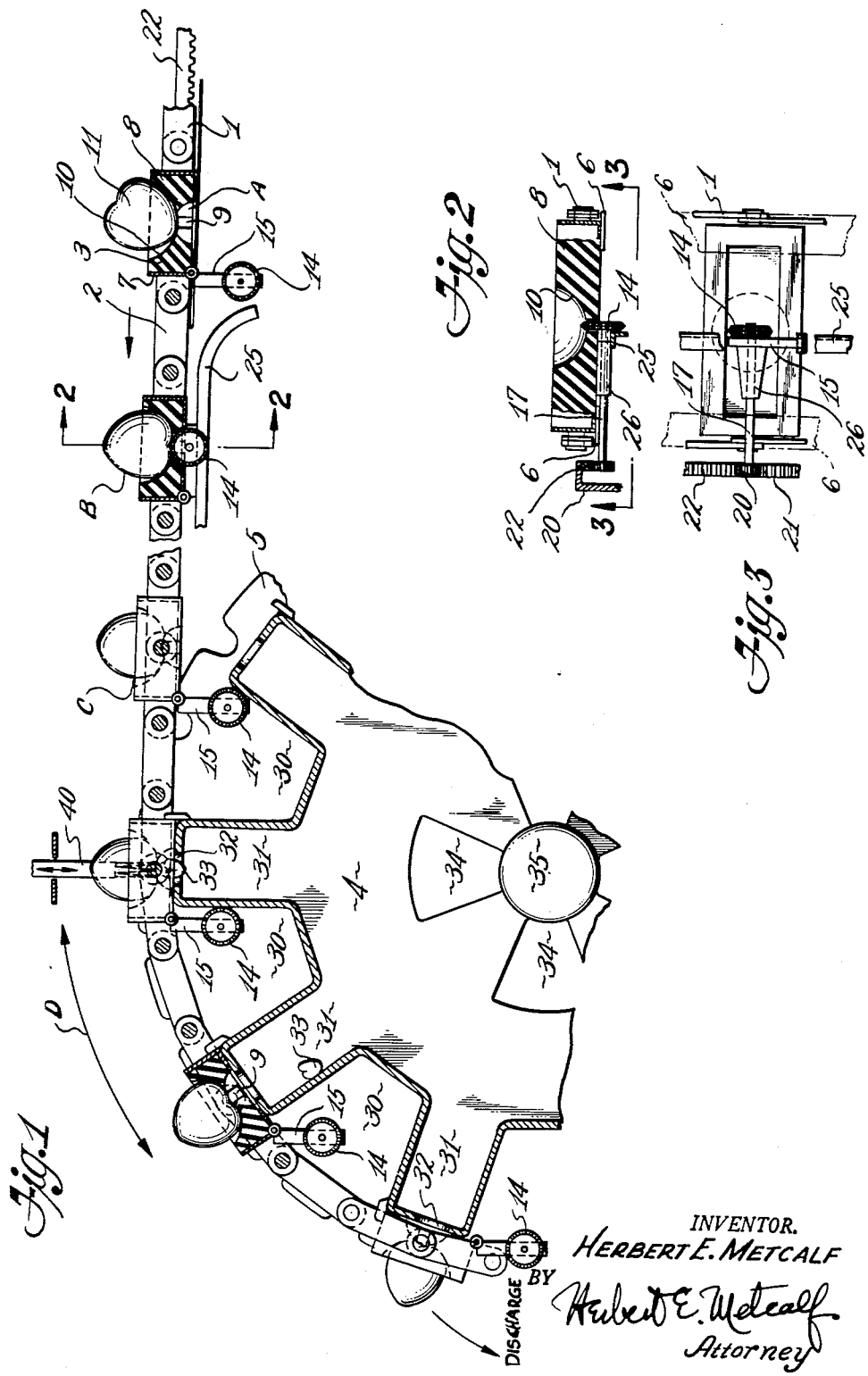
INVENTOR.
HERBERT E. METCALF
BY
Herbert E. Metcalf
Attorney Oct. 18, 1955 H. E. METCALF 2,720,962
MEANS FOR ORIENTATING INDENTED FRUIT
Filed Aug. 4, 1947 2 Sheets-Sheet 2
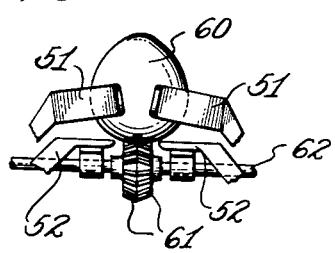
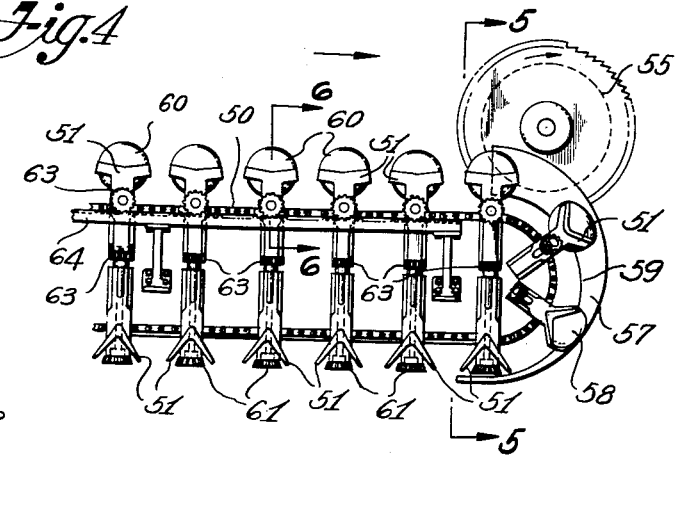
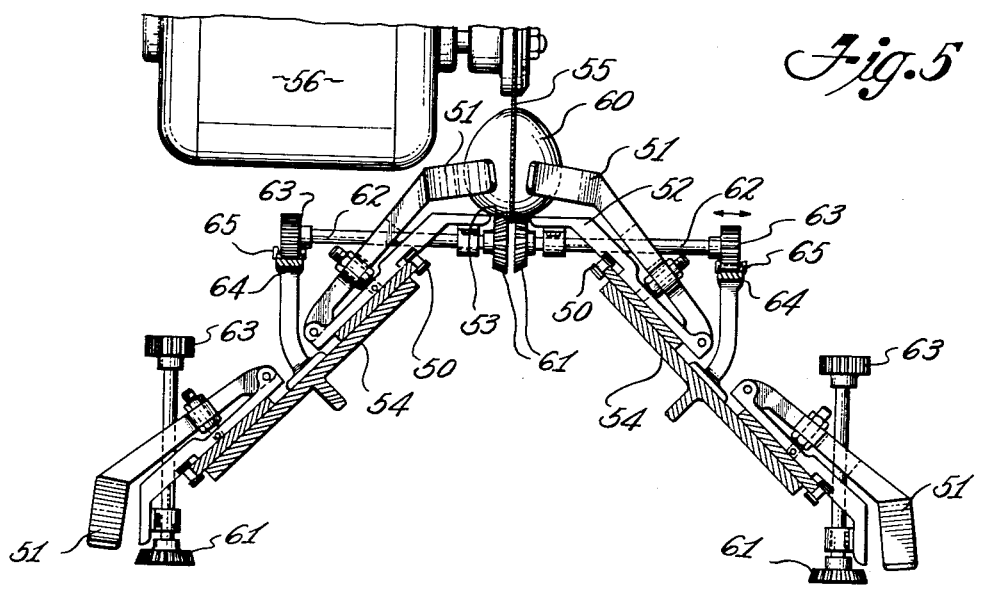
INVENTOR.
HERBERT E. METCALF
BY
Herbert E. Metcalf
Attorney United States Patent Office 2,720,962
Patented Oct. 18, 1955

2,720,962

MEANS FOR ORIENTATING INDENTED FRUIT

Herbert E. Metcalf, Los Angeles, Calif., assignor to S and W Fine Foods, Inc., San Francisco, Calif.

Application August 4, 1947, Serial No. 766,117

5 Claims. (Cl. 198—33)

My invention relates to fruit orientation devices. More particularly, it relates to a means for continuously and automatically orientating fruit having a stem indent, to the end that the fruit be delivered for an operation to remove the pit of the fruit with the stem indent thereof in a predetermined position.

An object of my invention is to provide a continuous, fully automatic, high speed orientator of relatively simple construction for indented fruits.

Other objects of my invention will be apparent or will be specifically pointed out in the description forming a part of this specification, but I do not confine myself to the embodiments of the invention herein described, as various forms may be adopted within the scope of the appended claims.

In the drawings:

Figure 1 is a diagrammatic view partly in section and partly in elevation of a machine embodying my invention as applied to orientating and pitting cherries.

Figure 2 is a sectional view of a fruit receptacle taken as indicated by the line 2—2 in Figure 1.

Figure 3 is a bottom plan view of the receptacle shown in Figure 2.

Figure 4 is a diagrammatic partial side view of a machine embodying my invention as applied to orientating and operating on the pits of peaches by halving the fruit with the stem indent in a predetermined position.

Figure 5 is a view, partly in section and partly in elevation, taken as indicated by the line 5—5 in Figure 4.

Figure 6 is a sectional view taken as indicated by the line 6—6 in Figure 4.

As far as is known, the first successful orientation of indented fruit utilizing rotation of the fruit around a horizontal axis is the means and method disclosed by Carroll for orientating peaches as exemplified by United States Patent No. 2,272,690, filed June 1, 1938, and for orientating cherries by United States Patent No. 2,220,511, filed September 12, 1939. In both instances a wheel partially supports the fruit while in a receptacle or enclosure. In the latter patent, the wheel is rotated to rotate the fruit around a horizontal axis. When the stem indent registers with the portion of the wheel driving the fruit rotation of the fruit ceases, as the wheel contour is proportioned to roughly fit the stem indent and the frictional drive contact is lost. After orientation, in both patents, the fruit is delivered to have an operation performed on the pit of the fruit such as, for example, the halving of a peach and the contained pit, or the complete removal of the pit of a cherry by a pitting knife or plunger.

One of the complications involved in the construction of such a machine is the placing of the wheels under the receptacles during orientation and the removal of the wheels during the operation on the pit, because in many instances the pit operating tool progresses over a path that would include the position of the wheel if left in proper orientation position. In Carroll 2,220,511, for example, interference of wheel and tool is avoided by orientating the fruit in one receptacle, transferring the fruit to another receptacle, and pitting the fruit in the latter receptacle, using an intermittent motion of the fruit conveyor. Such a device has proved highly successful, but requires mechanical devices to produce intermittent motion, which also slows production. The present invention can utilize a continuously moving conveyor by providing an orientation wheel for each fruit receptacle and then moving the wheel to a position where it can orientate the fruit along one portion of the conveyor path, and moving the wheel out of the way of the tool operating on the pit later so that pitting or halving can be accomplished without interference.

One preferred means and method for accomplishing such a result for cherries will be more fully understood by reference to Figures 1–3, inclusive.

In Figure 1, an endless conveyor 1 is formed from links 2 and receptacles 3, together forming a chain passing over a drum 4 driven continuously, as by sprocket 5. The chain returns underneath, passes around another drum (not shown) to extend in horizontal planes being supported on bars 6. Receptacles 3 are formed from a metal shell 7 holding a pitting rubber 8 having a pit aperture 9 in the bottom thereof. The fruit restraining cavity 10 is preferably cup-shaped so that indented fruit such as cherries 11 can be carried and rotated therein. This type of pitting machine is shown and claimed in the United States Patent No. 2,092,950.

Cooperating with each receptacle, preferably movably attached to the forward edge of the shell thereof, is a wheel 14 mounted on an arm 15 which in this instance is hinged to the bottom leading edge of shell 7, normally hanging down by gravity. Shaft 17 connected to wheel 14 extends laterally beyond the chain under bars 6, terminating in a pinion 20 engageable with a rack 21 having teeth 22 on the lower surface thereof. Beneath conveyor 1 over part of its horizontal path, prior to reaching a position where a pitting operation is to be performed, is positioned an elongated cam or slide 25 which serially intercepts shaft bearing 26 as the conveyor progresses, to move wheels 14 upwardly into pitting apertures 9, the rubber on each side of the apertures being cut away as shown at A to permit the wheels to enter the apertures and rotate freely. At the same time the raising of the wheels brings pinion 20 into contact with rack 21 so that as conveyor 1 progresses, wheels 14 rotate.

The wheels are raised sufficiently to contact fruit in the receptacles 3 and partially support them, except when the stem indent is down as shown at B. In this case the periphery of the wheel coincides with the stem indent and no rotation of the fruit can take place, as fully described in the Carroll Patent No. 2,220,511.

After the conveyor has progressed until the chain is about to enter a pitting zone, cam 25 terminates, permitting arms 15 to drop, as shown at C, thus clearing the pitting apertures 9.

Drum 4 is provided with recesses 30 to receive arms 15 with the attached wheels, shafts and pinions. The portions 31 of the drum between the recesses back up the receptacles 3 during the pitting operation, pit holes 32 being provided to permit pits 33 to enter the drum. Pits 33 are preferably washed out of the drum by a water jet (not shown) through drum apertures 34 close to the drum axle 35.

Pitting can be accomplished by a pitting blade 40 rocking around an arc centered on axle 35 as indicated by arcuate line D, the blade returning to pit the fruit in the next arriving receptacle. Thus, orientation and pitting are continuous and wheels 14 are moved out of the way of the pitting blade and the pit while the blade pushes the pit through the aperture 9 in the rubber. Such pitting mechanisms are well known in the art as exemplified by the Connor et al. Patent No. 2,092,956, issued September 14, 1937.

In operation, cherries are loaded in any convenient manner onto receptacles 3. They are rotated around a horizontal axis by wheel contact while the conveyor progresses. Just prior to pitting a large percentage of fruit is properly orientated and the wheels drop away from the receptacles. The fruit is pitted exactly as if no wheels had been present in apertures 9. The fruit thus orientated and pitted in the same receptacle and without stopping the conveyor.

While I have shown wheels 14 as being hinged to the receptacles at the forward edge, it is to be understood that the same action will take place, for example, if hinged at other locations to swing into and out of apertures 9. Furthermore, other variations deemed full equivalents will be apparent to those skilled in the art such as, for example, substitution of a spring leaf for arm 15, or wheels normally held in apertures 9 and moved downwardly at the time of pitting by the action of blade 40. In all events, wheels 14, normally maintained in apertures 9 for orientation purposes, are moved away from the aperture to clear it for pitting purposes.

The same principles as outlined above can be used when a different operation on a pit is to be undertaken such as, for example, the orientation and subsequent halving of peaches, as shown in Figures 4–6, inclusive.

In this case two endless chains 50 are used, each carrying a receptacle half 51 with bottom plates 52 spaced to provide an aperture 53 therebetween. Chains 50 progress over angular slides 54, the chains diverging after passing a saw blade 55 which is centrally positioned to halve the fruit being rotated, by motor 56. The fruit halves are separately carried laterally and downwardly on each side of saw blade 55 by receptacle halves 51 pressing fruit halves 58 against a curved slide 59 on each side of the device. The fruit halves are brought with the cut face down at the end of the slides 59 where additional operations, such as scooping out the pit halves may be performed, if desired.

The fruit, in this case whole peaches 60, is loaded in any convenient random manner at the input end where the receptacle halves are adjacent to form a horizontal receptacle. As shown in one embodiment (Figures 5 and 6), a wheel half 61 is attached to each receptacle half, the two wheel halves abutting to form effectively a single wheel projecting into aperture 53 as shown in Figure 6. Each wheel half 61 is mounted on a shaft 62 which extends laterally to terminate in a pinion 63 meshing with a rack 64 fastened to each slide 54. Rack 64 is provided with side guides 65 which hold the wheel halves together as the conveyor progresses. The wheels then rotate to rotate the peach and orientate it with the stem indent down, the operation being identical with that described for cherries.

As saw blade 55 extends below the level of the wheel formed by wheel halves 61, and would contact the composite wheel during the sawing operation, the wheel halves are moved outwardly just prior to sawing by spacing the two racks slightly farther apart. The saw blade then passes between the wheel halves as the receptacles and wheels progress as shown in Figure 5. As saw blade 55 is relatively thin, the outward movement of the two wheel halves necessary to prevent saw blade contact is not sufficient to disturb an accomplished orientation.

Thus, in both modifications described, fruit orientation by a wheel takes place over one portion of the conveyor path, with the wheel and/or wheel components moved out of the way of a tool operating on the pit of the fruit. Because of the fact that, in the modifications described, the receptacles are sometimes formed in halves, and in other instances the wheels are formed from halves, the terms receptacle and wheel, as used in the present specification and claims, are both deemed to include integral units or the combination of several components.

I claim:

1. A machine for orientating indented fruit comprising a conveyor, a plurality of fruit receiving receptacles on said conveyor, said receptacles having apertures in the bottom thereof of lesser diameter than that of fruit in said receptacles, a fruit rotating wheel mounted to rotate on a horizontal axis and movably attached to the under side of each receptacle on said conveyor and moving therewith, said wheels being mounted to be movable into and out of said apertures, means for moving said wheels into and out of said apertures and means for rotating said wheels on their axes when in said apertures.

2. A machine for orientating indented fruit comprising a conveyor movable over a closed path, a plurality of fruit receiving receptacles on said conveyor, said receptacles having apertures in the bottom thereof of lesser diameter than that of fruit in said receptacles, a fruit rotating wheel mounted on a horizontal axis and hinged to each receptacle to move in a vertical plane and travelling with said receptacle the entire extent of said path, means for moving said wheels upwardly into said apertures over a portion of said path and means for releasing said wheel to fall out of and laterally away from said aperture by gravity over another portion of said path.

3. In a machine for orientating indented fruit, a fruit receiving receptacle having a lower aperture therein, a fruit rotating member movably attached to the underside of said receptacle and mounted to rotate in a vertical plane, means for moving said fruit rotating member into and out of a position contacting fruit in said receptacle, and means for rotating said member in said vertical plane while in said fruit contacting position.

4. In a machine for orientating indented fruit, a fruit receiving receptacle having a lower aperture therein, a fruit rotating member movably attached to the underside of said receptacle and mounted to rotate in a vertical plane, means for moving said fruit rotating member through said aperture into and out of a position contacting fruit in said receptacle, and means for rotating said member in said vertical plane while in said fruit contacting position.

5. In a machine for orientating indented fruit, a fruit receiving receptacle having an operating space therein adjacent the bottom thereof, a fruit rotating member movably attached to the underside of said receptacle and mounted to rotate in a vertical plane, and additionally mounted to be movable from a position in said space where said fruit rotating member will contact a fruit in said receptacle to a position where said fruit rotating member is out of said operating space and out of contact with said fruit, means for moving said member from one of said positions to the other of said positions, and means for rotating said member while in said fruit contacting position.

References Cited in the file of this patent

UNITED STATES PATENTS

| 1,742,653 | Goranson | Jan. 7, 1930 |
| 2,157,518 | Ashlock, Jr. | May 9, 1939 |
| 2,220,511 | Carroll | Nov. 5, 1940 |
| 2,265,515 | Carroll | Dec. 9, 1941 |
| 2,296,490 | Ashlock, Jr. | Sept. 22, 1942 |
| 2,406,311 | Ashlock, Jr. | Aug. 27, 1946 |